V. HENRI, A. HELBRONNER & M. VON RECKLINGHAUSEN.
APPARATUS FOR TREATING LIQUIDS WITH ULTRA VIOLET RAYS.
APPLICATION FILED FEB. 13, 1911.

1,118,006.

Patented Nov. 24, 1914.

V. HENRI, A. HELBRONNER & M. VON RECKLINGHAUSEN.
APPARATUS FOR TREATING LIQUIDS WITH ULTRA VIOLET RAYS.
APPLICATION FILED FEB. 13, 1911.

1,118,006.

Patented Nov. 24, 1914.
4 SHEETS—SHEET 2.

V. HENRI, A. HELBRONNER & M. VON RECKLINGHAUSEN.
APPARATUS FOR TREATING LIQUIDS WITH ULTRA VIOLET RAYS.
APPLICATION FILED FEB. 13, 1911.

1,118,006.

Patented Nov. 24, 1914.
4 SHEETS—SHEET 3.

WITNESSES

INVENTORS

V. HENRI, A. HELBRONNER & M. VON RECKLINGHAUSEN.
APPARATUS FOR TREATING LIQUIDS WITH ULTRA VIOLET RAYS.
APPLICATION FILED FEB. 13, 1911.

1,118,006.

Patented Nov. 24, 1914.
4 SHEETS—SHEET 4.

WITNESSES

INVENTORS

UNITED STATES PATENT OFFICE.

VICTOR HENRI, ANDRÉ HELBRONNER, AND MAX von RECKLINGHAUSEN, OF PARIS, FRANCE, ASSIGNORS, BY MESNE ASSIGNMENTS, TO THE R. U. V. COMPANY, INC., A CORPORATION OF NEW YORK.

APPARATUS FOR TREATING LIQUIDS WITH ULTRA-VIOLET RAYS.

1,118,006.　　　Specification of Letters Patent.　　Patented Nov. 24, 1914.

Application filed February 13, 1911. Serial No. 608,473.

*To all whom it may concern:*

Be it known that we, VICTOR HENRI and ANDRÉ HELBRONNER, citizens of the Republic of France, and MAX VON RECKLING-HAUSEN, a subject of the Emperor of Germany, residing at Paris, France, have invented the new and useful Improvements in Apparatus for Treating Liquids with Ultra-Violet Rays, of which the following is a specification.

In the specification accompanying our application for Letters Patent Serial No. 546252, we have described a method and apparatus for the sterilization of milk and other liquid foods, liquids used for medicinal and surgical purposes, serums and the like, in accordance with which the liquid to be sterilized is subjected in the form of a thin film to the action of ultra violet rays.
The present invention relates to improvements in apparatus for sterilizing liquids of the above mentioned character and is particularly applicable for liquids, such as milk, which are more or less opaque to ultra-violet rays. Some of the forms of construction of the apparatus hereinafter described are also suitable for treating liquids with ultra-violet rays for purposes other than sterilization and their action can be usefully employed for maturing or aging wines, spirits and other potable liquors, for bleaching oils and for promoting chemical reactions in liquids.

In order that the nature of our invention may be clearly understood we will now proceed to describe the same with reference to the accompanying drawings, in which several forms of construction of the apparatus in accordance with the invention are illustrated by way of example.

Figure 1:
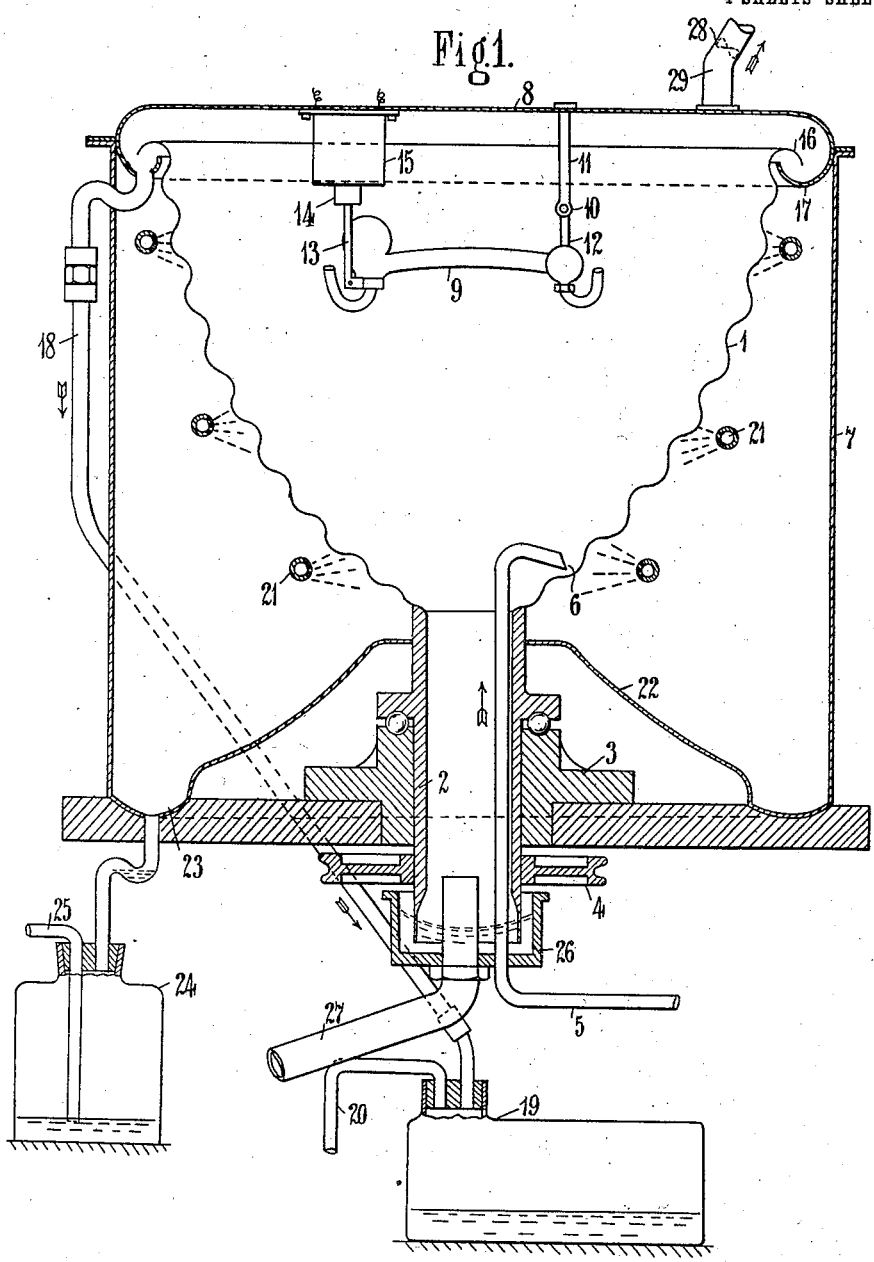
Figure 2:
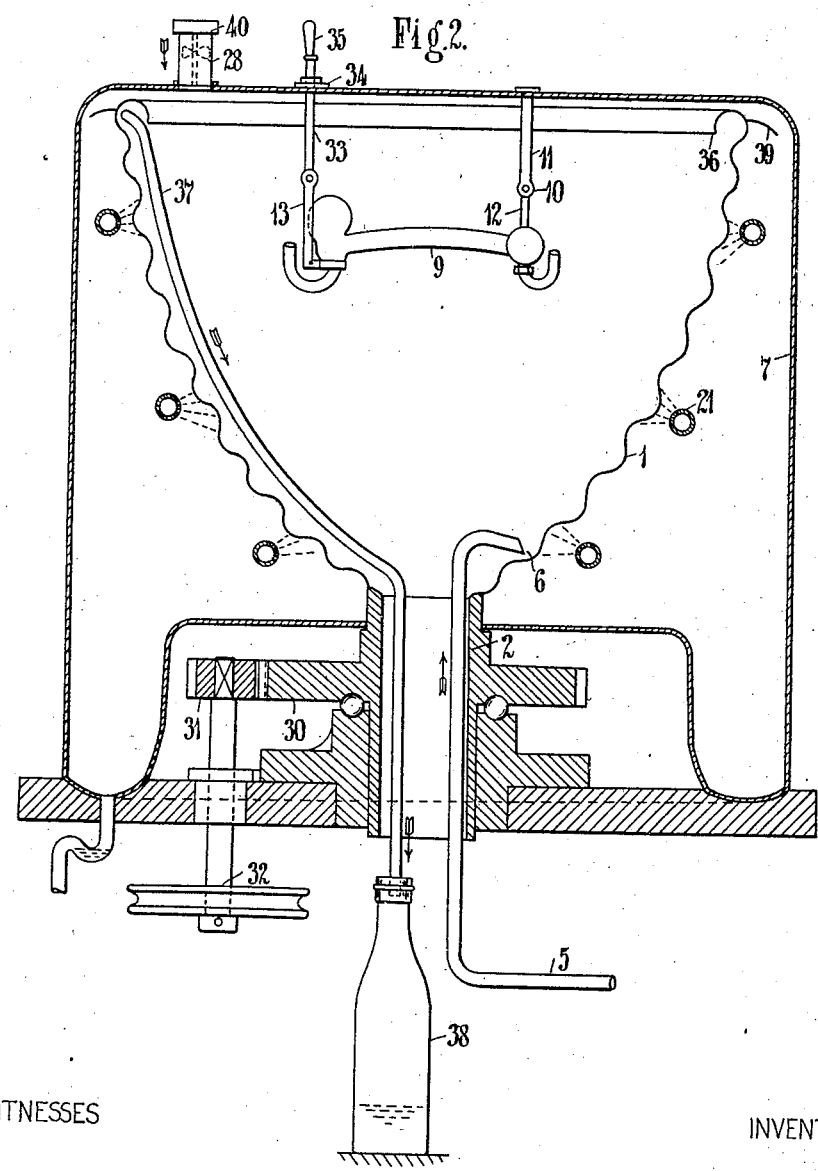
Figure 3:
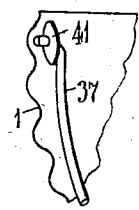
Figure 4:
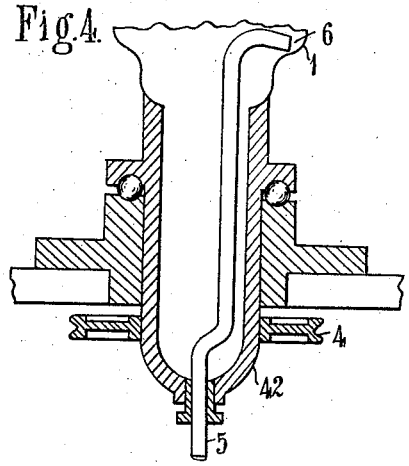
Figure 5:
Figure 6:
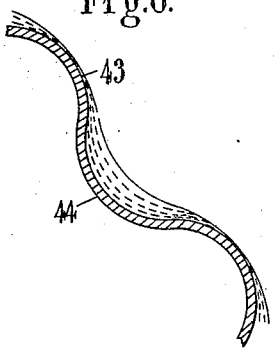
Figure 7:
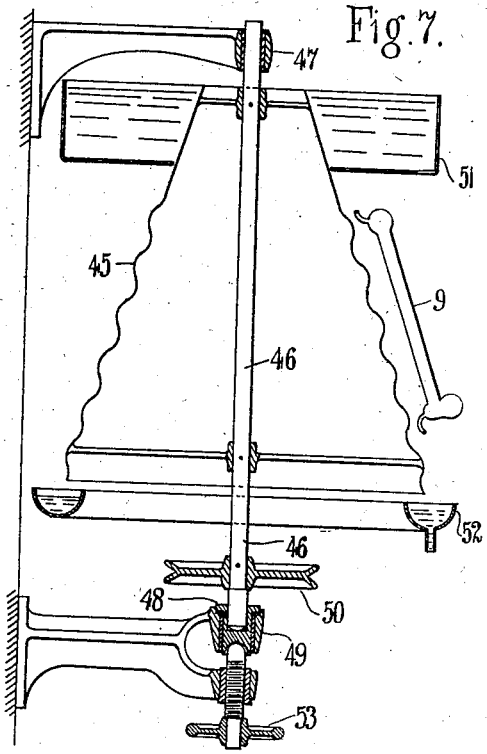
Figure 8:
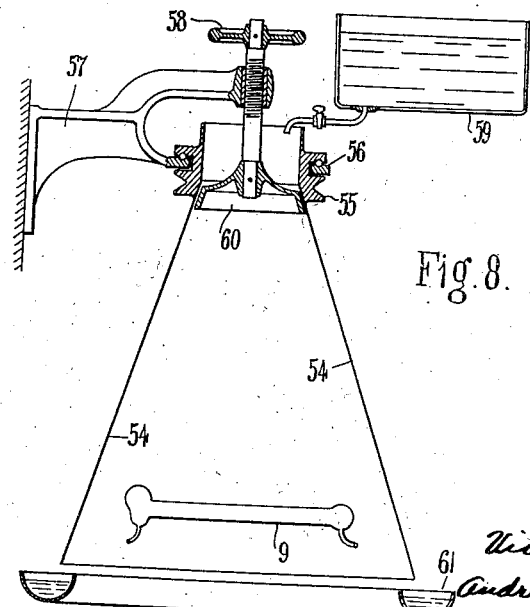

Figure 1 is a sectional elevation of one form of the sterilizing apparatus and Fig. 2 shows a sectional elevation of a modified form of construction. Fig. 3 is a detail view of the device used for collecting the liquid at the top of the rotatable funnel, and Fig. 4 is a detail view of a modified form of construction of the lower part of the apparatus. Fig. 5 is a diagrammatic representation of a film of liquid as it would adapt itself under the action of centrifugal force on a smooth surface and Fig. 6 shows the nature of the film produced with an apparatus having a corrugated surface operated in accordance with the invention. Figs. 7 and 8 show views in sectional elevation of further modifications of the apparatus.

In the form of construction shown in Fig. 1, the funnel shaped vessel 1 having a corrugated surface is supported at its lower end 2 in a fixed bearing 3. At the lower end of the funnel a pulley 4 is mounted which may be driven with a belt by means of a motor or other apparatus. The liquid to be sterilized by the ultra-violet rays is delivered from a supply tank (not shown) through the inlet pipe 5 to a point 6 on the inner surface of the lower part of the funnel. The funnel shaped vessel is inclosed in a hood 7 on the cover 8 of which the lamp 9 which is the source of the ultra-violet rays is suspended. Any convenient source of ultra-violet rays may be used for the purposes of this invention, but we prefer to employ a mercury vapor lamp of a well known type provided with a quartz container. As it is necessary that lamps of this type should be tilted in order to operate them on starting, apparatus for this purpose is provided. An example of such apparatus is shown in Fig. 1. One end of the lamp is supported by the collar 12 and pivoted at 10 to a bracket 11. The other end of the lamp is supported by a collar 13 which is attached to the armature 14 of an electro-magnet 15 mounted on the cover of the apparatus.

The top of the funnel shaped vessel is bent over as shown at 16 so that the liquid is delivered from the edge into a channel 17 from which it flows away through the tube 18 to the reservoir 19. This reservoir may be connected by the pipe 20 to a vacuum pump in order to assist the delivery of the liquid to the reservoir. Within the hood 7 are located a series of perforated tubular rings 21 by means of which water may be sprayed on to the exterior of the funnel for the purpose of cooling the liquid which is being sterilized. A protecting shield 22 is provided in order to prevent access of water to the bearings and to lead it away to the outlet 23 whence it can be collected in a chamber 24 from which it is pumped away through the tube 25. The lower part of the funnel is arranged to rotate in a hydraulic seal 26.

In order to prevent the ozone, which is formed when ultra-violet rays are passed through air, from acting injuriously on the liquid which is being sterilized, filtered air is admitted to the apparatus through the inlet 27 and the current of filtered air is maintained by means of a fan 28 which may be suitably located for instance in the shaft 29 at the top of the hood.

The operation of the apparatus is as follows:—When the lamp circuit is closed, the current energizes the electro-magnet 15 which acts on the armature 14 and causes the lamp to operate. The funnel is rotated by means of the pulley 4 so that the liquid delivered at 6 is caused by centrifugal force to ascend in the corrugated funnel until it reaches the top whence it passes into the channel 17 and is collected and flows away through the tube 18 to the reservoir 19. While the apparatus is being operated a spray of water is supplied to the exterior of the funnel through the tubes 21 in order that the liquid may be kept cool. The speed of rotation of the funnel will be dependent upon the dimensions of the apparatus and the specific gravity and viscosity of the liquid which is being sterilized and will be so chosen that the liquid which is being treated is caused to ascend until it reaches the top of the funnel.

In the modified form of construction shown in Fig. 2 the funnel 1 is provided at its lower end 2 with a gear 30 with which engages a pinion 31 mounted on the driving shaft 32. The lamp 9 in this form of construction is operated by hand in order to cause it to start. One end of the lamp is supported by a collar 12 pivotally connected at 10 to the bracket 11. The collar 13 at the other end of the lamp is connected to a rod 33 passing through a bush 34 in the cover of the apparatus, and the lamp can, therefore, be tilted by simply raising the handle 35. In this construction the top edge of the funnel is bent over toward the interior as shown at 36 and the liquid is collected by means of a tube 37 arranged in the interior of the funnel. From the tube 37 the liquid passes away to the bottle 38 which is placed directly underneath the lower open end of the funnel. The liquid can, therefore, be collected in the bottle 38 and sealed off while still under the influence of the ultra-violet rays so that there is no possible chance of the liquid becoming re-infected. On the outer edge of the rotatable funnel near the top, a flange 39 is provided for the purpose of throwing off any cooling water which by centrifugal force may tend to rise and creep over into the inside of the funnel. Filtered air is drawn into the apparatus through the inlet 40 by means of a fan 28 and it passes out of the apparatus through the lower part of the funnel.

The collecting tube 37 for the liquid which is shown in Fig. 2 is preferably provided with a shield 41 as shown in Fig. 3 in order to prevent the liquid from spilling when entering the collecting tube.

If it is desired to work under a pressure considerably less than that of the atmosphere, the hydraulic seal 26 shown in Fig. 1 is replaced by a stuffing box as illustrated in Fig. 4. The inlet tube 5 for the liquid passes through the stuffing box 42 and the liquid which has been sterilized is drawn away to the reservoir by means of a vacuum pump.

The manner in which the liquid spreads itself on the surface of the apparatus will be clearly understood by reference to Figs. 5 and 6. In Fig. 5 which shows an apparatus with a plain surface, the liquid rises in a film of even thickness and for any particular liquid the apparatus must be rotated at a definite corresponding speed in order to obtain a film of the desired thickness (tenuity). If the density of the liquid is changed then either too thick a film or too slow a speed of travel of the liquid over the surface may be obtained and consequently either a poor efficiency, that is to say the amount of liquid passing through the apparatus in a given time will be too small, or incomplete sterilization may be the result. In the case, however, of a vessel having a corrugated surface, the liquid is distributed in a film of varying thickness. On the raised portions 43 of the corrugated surface the film of liquid will be exceedingly thin even if the speed of rotation is only just sufficient to make the liquid rise in the funnel although in the grooves 44 the film of liquid will be much thicker. The ultra-violet rays will therefore be capable of penetrating right through the film of liquid on the raised portions of the surface of the vessel, and moreover the varying thickness of the film of liquid will cause the surface of liquid to be constantly changing so that fresh surfaces are continually being presented to the action of the rays. Furthermore in the case of an apparatus with a corrugated surface the speed of rotation need not be determined with the same exactness as in the case of an apparatus with a plain surface.

Although the apparatus as above described is provided with a funnel of substantially parabolic shape, it will be clear that it may also be of conical or cylindrical form. In the drawings the funnel shaped vessel is shown mounted vertically but it may also be mounted so that its axis is inclined to the perpendicular, and in some cases it may be advantageous to mount the apparatus so that the axis of the same is horizontal. Modifications in the device used for collecting the liquid from the upper part of the funnel and in the apparatus for cooling the liquid which is being sterilized may also be adopted without departing from the spirit and scope of the invention.

Referring now to Fig. 7, the apparatus comprises a substantially cone shaped body 45 mounted on a spindle 46 which is adapted to be rotated in the bearings 47 and 48, by means of the pulley 50. The lower bearing 48 is mounted in a vertically arranged sleeve 49 in order that the cone may be raised or lowered by means of the adjustment screw 53. The liquid to be sterilized is contained in the receptacle 51 which surrounds the upper part of the cone and by adjusting the height of the latter, a film of any desired thickness may be caused to flow down the cone 45. The liquid is thus submitted to the action of the ultra-violet rays emitted by the lamp 9 and is collected in the annular trough 52 from which it may be conveyed away to the receptacle for sterilized liquid.

In the modification shown in Fig. 8 a hollow conical vessel 54 is supported in a collar 56 provided in the bracket 57. A pulley 55 is provided on the vessel for the purpose of rotating it and the entrance to the vessel is adapted to be closed by means of the valve 60 which can be adjusted by means of the screw 58. Liquid is admitted on to the interior surface of the cone from the receptacle 59 and by turning the screw 58 a film of the desired thickness may be obtained. The liquid is thus spread over the interior surface of the rotating cone 54 where it is exposed to the rays emitted by the lamp 9. After being sterilized the liquid is collected in the annular trough 61.

It will be understood that the apparatus herein described is illustrative only and modifications may be made in the construction without departing from the spirit and scope of the invention.

We claim as our invention:—

1. In an apparatus for treating liquids with ultra-violet rays the combination of a rotatable funnel, a delivery pipe adapted to supply liquid through the lower part of said funnel, means for rotating said funnel at such a speed that the liquid rises by centrifugal force, a trough adapted to collect liquid projected from the upper part of said funnel, a source of ultra-violet rays located in said funnel and means for cooling the exterior surface of said funnel.

2. In apparatus for treating liquids by ultra-violet rays, the combination of a rotatable funnel, means for supplying liquid to the lower part of said funnel, means for rotating said funnel at a speed sufficient to cause the liquid to rise by centrifugal force, a liquid seal at the lower part of said funnel, a container inclosing said funnel, and a source of ultra-violet rays located in said funnel.

3. In apparatus for treating liquids by means of ultra-violet rays, the combination of a rotatable funnel having a corrugated surface, said funnel being bent outward forming a lip on the upper edge, means rigidly attached to the stem of said funnel for rotating the same, a source of ultra-violet rays located in said funnel, an annular trough surrounding said lip, means for cooling the exterior surface of said funnel, a container inclosing said funnel and means for passing a current of sterile air through said funnel.

In testimony whereof we have hereunto subscribed our names this 1st day of Feb. 1911.

VICTOR HENRI.
ANDRÉ HELBRONNER.
MAX von RECKLINGHAUSEN.

Witnesses:
  DEAN B. MASON,
  BARTLEY F. YOST.